United States Patent [19]

Hall

[11] Patent Number: 4,474,620
[45] Date of Patent: Oct. 2, 1984

[54] APPARATUS FOR PURIFICATION OF WATER BY ION EXCHANGE

[76] Inventor: James W. Hall, 1302 Dale St., Longview, Tex. 75601

[21] Appl. No.: 543,826

[22] Filed: Oct. 20, 1983

[51] Int. Cl.³ ............................................. B01D 57/00
[52] U.S. Cl. ................................ 210/257.1; 210/282; 210/284
[58] Field of Search ............... 210/662, 685, 686, 694, 210/96.1, 120, 255, 257.1, 259, 262, 282, 284, 436, 472, 256, 290

[56] References Cited

U.S. PATENT DOCUMENTS

| | | | |
|---|---|---|---|
| 1,579,158 | 3/1926 | Smilie | 210/436 |
| 4,182,676 | 1/1980 | Casolo | 210/686 |
| 4,280,912 | 7/1981 | Berry et al. | 210/662 |

*Primary Examiner*—Ivars Cintins
*Attorney, Agent, or Firm*—Pravel, Gambrell, Hewitt & Kimball

[57] ABSTRACT

An ion exchange water purification apparatus in a unitary housing which makes use of gravity and a manometer effect to flow water through the water treatment beds. The apparatus has an untreated water reservoir at the top, untreated water flows by gravity and the manometer effect through a series of three water treatment beds containing carbon, cation exchange resin and anion exchange resin, respectively. The media in each water treatment chamber is in cartridge form and may be easily removed through the removable top of each water treatment chamber. Treated water from the final water treatment chamber is collected in a reservoir within the housing below the untreated water reservoir. The three water treatment chambers are located within the treated water reservoir to economize on space. The pressure in the water treatment chambers and the treated water reservoir is equalized with the pressure in the untreated reservoir by manometer vent tubes so that as long as there is water in the untreated water reservoir, the treated water reservoir will remain full due to gravity and the manometer effect.

9 Claims, 4 Drawing Figures

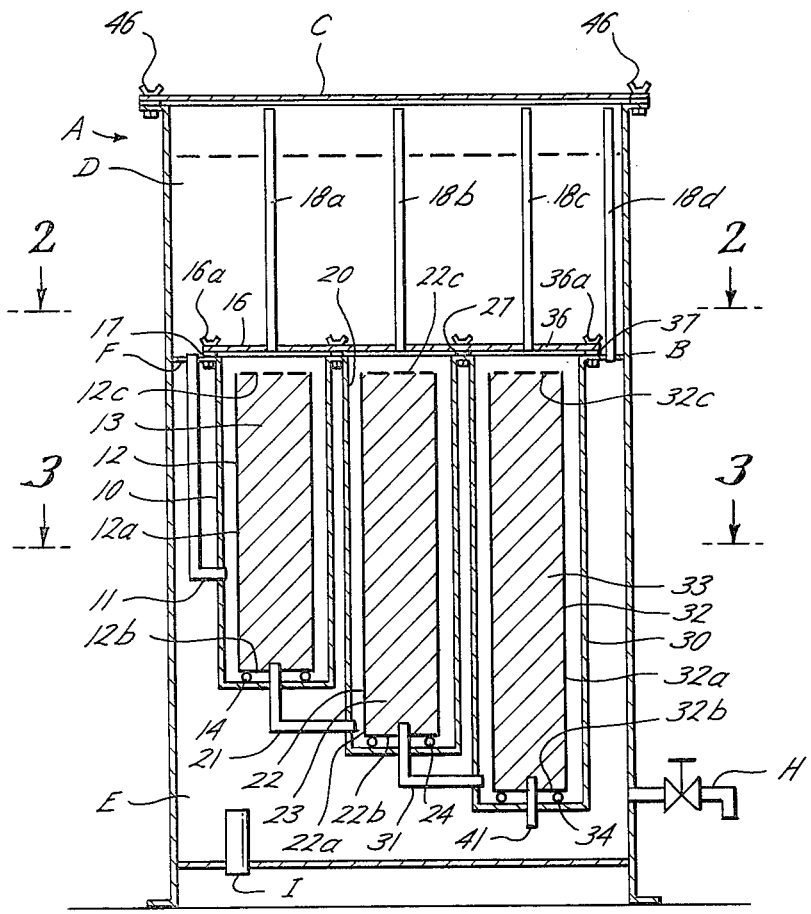
Fig. 1
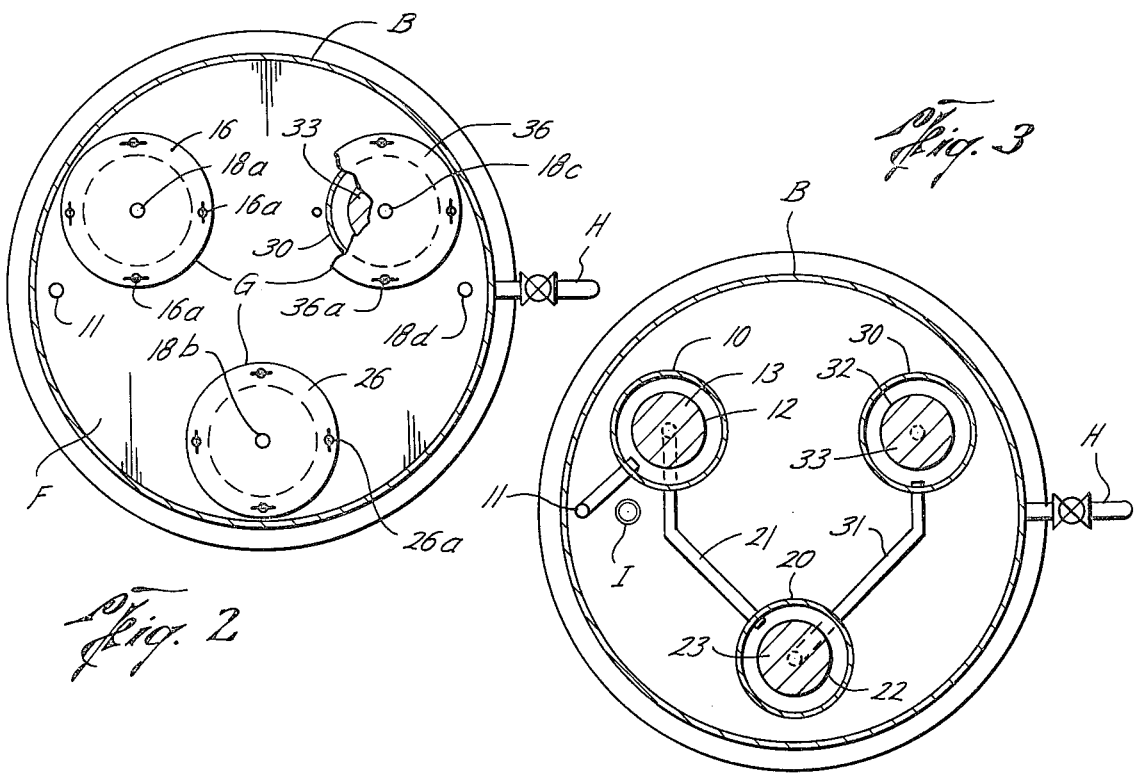
Fig. 2
Fig. 3

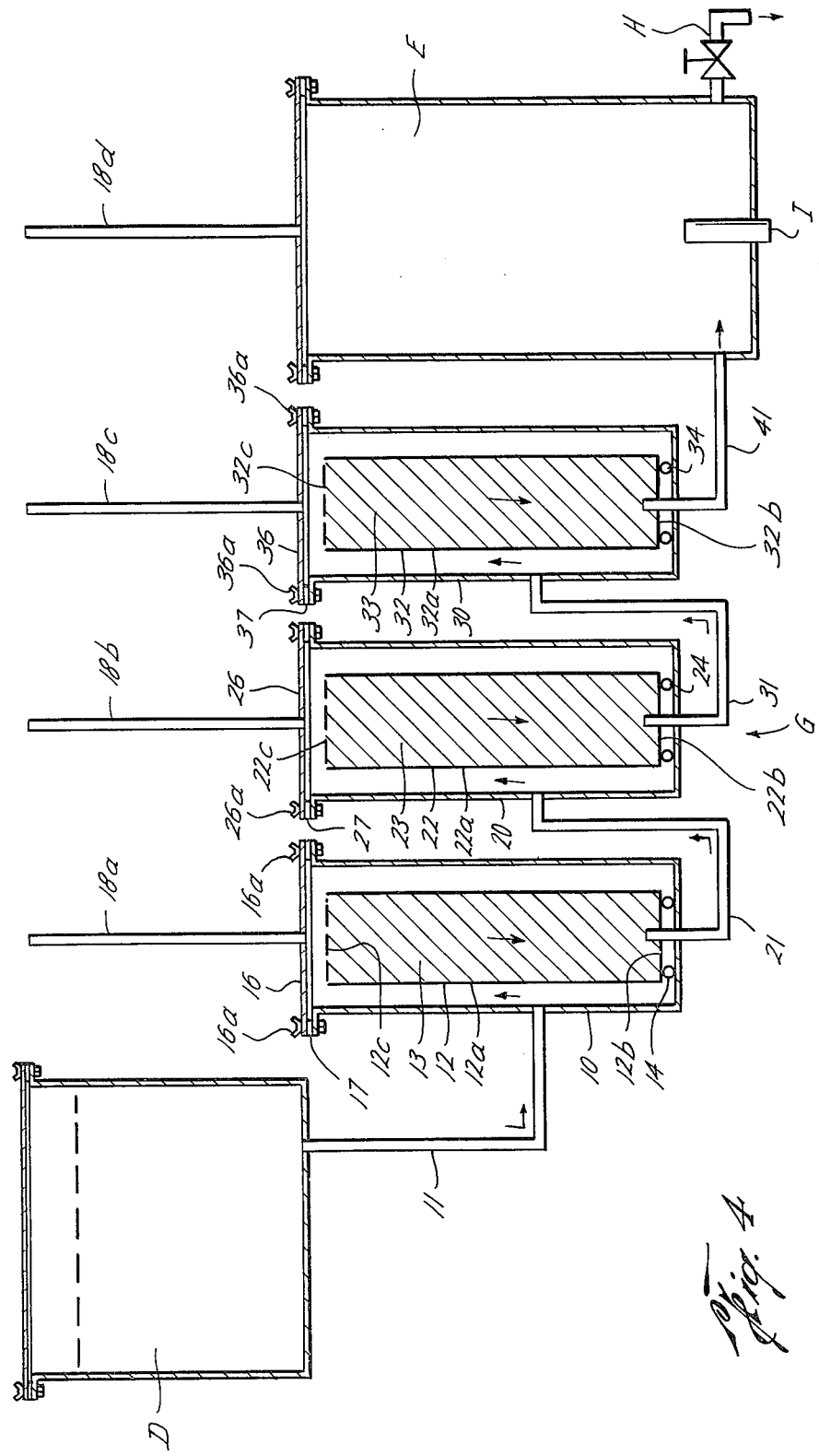

APPARATUS FOR PURIFICATION OF WATER BY ION EXCHANGE

FIELD OF THE INVENTION

The present invention relates to an ion exchange water purification apparatus.

DESCRIPTION OF THE PRIOR ART

The preparation of highly purified water has traditionally been by distillation. The development of synthetic ion exchange resins has made purification of water by filtration through ion exchange beds common. Typically, a cation bed followed by an anion bed is used. Where regeneration is not at issue the cation and anion beds can be combined by stratification or intermixing resins. Due to the hazardous nature of the acid and alkaline solutions used for regeneration, such ion exchange apparatus has generally been limited to commercial or professional use.

Typically, such commercial ionization treatments are preceded by a treatment to remove organic matter such as by contact with activated carbon. In domestic water treatment pretreatment with activated carbon will convert free chlorine to chloride ions which can be removed by the anion exchange resin.

U.S. Pat. No. 4,025,426 disclosed the use of a series of stacked carbon containers to purify, in an industrial setting, a liquid waste that included the capability of regeneration of the carbon medium. U.S. Pat. No. 2,703,313 taught a cation exchange apparatus wherein a cascading arrangement of beds with shallow layers of resin were used. In U.S. Pat. No. 4,196,081, a pump was used to pump contaminated water through a series of water treatments.

Prior art devices were generally not suitable for non-commercial non-industrial uses due to dangers encountered during regeneration, or the devices required pumps to force the water through the resin exchange beds.

SUMMARY OF THE INVENTION

The present invention relates to a new and improved ion exchange water treatment device using gravity flow of water through the resin beds.

It is an object of the present invention to provide an ion exchange apparatus for purifying water suitable for non-commercial and non-professional users.

It is a further object of the present invention to provide an ion exchange apparatus for purifying water wherein a manometer effect allows gravity flow of water through the resin beds. The length to diameter ratio of the resin beds can be from 1 to 6. However, the length or depth of the beds are three times the width or diameter to obtain the most effective deionization.

The apparatus comprises a water-tight container divided into an upper chamber and a lower chamber. The upper chamber is a storage reservoir for untreated water while the lower chamber is a reservoir for treated water. A plurality of water treatment chambers are connected in series by tubes such that water from the upper reservoir flows through the water treatment chambers into the lower chamber. The water treatment chambers enclose removable water treatment cartridges comprising cylinders having open ends containing the water treatment medium. Each water treatment chamber has a removable cover which includes a manometer vent tube to equalize pressure between the upper reservoir and each chamber. A similar manometer vent in the lower reservoir equalizes pressure between the lower reservoir and the upper reservoir so that as purified water is withdrawn from the lower reservoir the gravitational manometer effect allows water from the untreated reservoir to flow through the water treatment chambers into the treated reservoir. Thus, the apparatus will constantly maintain the level of treated water in the lower reservoir as long as untreated water is supplied to the upper reservoir.

Included in the treated reservoir is a water outlet and an ion sensor. The ion sensor measures ion concentrations in the treated water reservoir and indicates the necessity of water treatment element replacement or regeneration when the ion concentration is at an undesirable level.

DESCRIPTION OF THE DRAWINGS

FIG. 1 is a cross-sectional side view of the present invention.

FIG. 2 is a cross-sectional view along lines 2—2 of FIG. 1.

FIG. 3 is a cross-sectional view along lines 3—3 of FIG. 1.

FIG. 4 is a schematic representation of the present invention.

DESCRIPTION OF THE PREFERRED EMBODIMENT

The apparatus A consists of a cylindrical vessel B having a removable top C. The vessel B is divided into an upper chamber D, and a lower chamber E by baffle F. Supported by baffle F and extending into lower chamber E are three water treatment chambers G. Lower chamber E has a treated water outlet H, and an ion sensor I. Each water treatment chamber G encloses a water treatment element as will be more fully described herein.

Upper chamber D serves as a reservoir for untreated water and is connected to first water treatment chamber 10 by a tube 11 which extends through baffle F into the first water treatment chamber 10. Fitted within water treatment chamber 10 is an activated carbon water treatment means 12 which comprises a cylinder 12a having open ends 12b and 12c which contain activated carbon 13, preferably of from twenty to forty mesh in size. Water treatment cartridge 12 is sealed to a base of the first water treatment chamber 10 by O-ring 14 such that water flowing through the carbon 13 is drawn through tube 21 extending through the base of the first water treatment chamber 10 and into second water treatment chamber 20. The top of first water treatment chamber 10 is sealed by cover 16 secured by wing nuts 16a and sealed by a suitable seal 17. Extending upward through cover 16 is manometer vent tube 18a which extends upward into upper chamber D to equalize pressure between upper chamber D and first water treatment chamber 10.

Extending from the base of first water treatment chamber 10 into the second water treatment chamber 20 is tube 21. The second water treatment chamber 20 encloses a second water treatment means 22 which comprises a cylinder 22a having open ends 22b and 22c enclosing a cation exchange resin 23. Second water treatment cartridge 22 is sealed to the base of second water treatment chamber 20 by O-ring 24. Water flowing into second water treatment chamber 20 through tube 21 flows upwardly along the exterior of water treatment cylinder 22a, down through the water treatment resin 23 and out the tube 31 in the center of the base of water treatment chamber 20. The top of the second water treatment chamber 20 is sealed by cover 26 secured by wing nuts 26a and including a suitable seal 27. Extending through cover 26 is a second manometer vent tube 18b which equalizes pressure between upper chamber D and second water treatment chamber 20. Extending from the base of second water treatment chamber 20 into third water treatment chamber 30 is tube 31.

Third water treatment chamber 30 encloses a third water treatment cartridge 32 which comprises a cylinder 32a having open ends 32b and 32c which encloses an anion exchange resin 33. Third water treatment cartridge 32 is sealed to the base of water treatment chamber 32 by O-ring 34. Water flowing into chamber 30 through tube 31 flows upward along the exterior of cylinder 32 down through exchange resin 33 and out tube 40. Third water treatment chamber 30 is sealed at its top by cover 36 secured by wing nuts 36a and including a suitable seal 37. Extending upward from cover 36 is a third manometer vent tube 18c to equalize the pressure between upper chamber D and third water treatment chamber 30. Extending from the base of third water treatment chamber 30 into lower chamber E is a tube 41.

An alternate arrangement of the ion exchange water purification apparatus A of the present invention is shown schematically in FIG. 4. Like parts in FIGS. 1 and 4 bear the same numerals and letter designations. The following description of the operation of FIG. 4 applies also to the preferred embodiment of FIG. 1. The upper chamber D is filled with untreated water. The water flow is indicated by arrows in FIG. 4. Gravity causes water to flow from upper chamber D to the first water treatment chamber 10 through tube 11. Water entering first water treatment chamber 10 through tube 11 flows upward along the exterior of carbon water treatment cartridge 12 through the open upper end 12c of the carbon water treatment cartridge 12 and down through the activated carbon 13 to the first water treatment chamber outlet tube 21. Water flows through the tube 21 and enters the second water treatment chamber 20, the water then flows upwardly along the exterior of second water treatment cartridge 22, through the open end of the second water treatment cartridge 22c and down through the cation exchange resin 23. Cation exchange resin 23 is preferably a strongly acidic cation exchange resin in the hydrogen form. From the second water treatment chamber 20 treated water flows through the tube 31 into third water treatment chamber 30. The water flows upwardly along the exterior of the third water treatment cartridge 32, through the open end 32c and downwardly through the anion exchange resin 33. Anion exchange resin 33 is preferably a strongly basic anion exchange resin in the hydroxyl form. From the third water treatment chamber 30, water flows through tube 41 into the lower chamber E which serves as a reservoir for treated water.

Manometer vent tubes 18a, 18b, 18c and 18d allow air to be vented from water treatment chambers 10, 20, 30 and lower chamber E during startup and for equalizing water pressures between the upper chamber D, and water treatment chamber 10, 20, 30 and lower chamber E during the operation of the apparatus. The equalization of pressure in chambers D, 10, 20, 30 and E by manometer vent tubes 18a, 18b, 18c and 18d also creates a manometer effect such that as treated water is withdrawn from lower chamber E through outlet H, gravity forces untreated water from upper chamber D through water treatment chambers 10, 20 and 30 to replenish the treated water in lower chamber E.

As shown in FIGS. 1 and 4, a conventional ion sensor I is mounted in chamber E to measure ion concentration of the treated water within lower chamber E to indicate when water treatment cartridges 13, 23 and 33 should be replaced or regenerated.

When ion sensor I indicates an unacceptable ion concentration in the treater water reservoir E, the water treatment cartridges can be removed and regenerated or replaced. Cover C secured by wing nuts 46 is first removed. Covers 16, 26 and 36 secured by wing nuts 16a, 26a and 36a are removed and water treatment cartridges 13, 23 and 33 are removed and replaced or regenerated.

Thus, with the apparatus of this invention, a person can have a readily available compact household size unit which provides treated water on demand, simply by the user opening the valve H. The quantity of water supplied to chamber D may be initially provided and replenished periodically simply by filling it from a household faucet or other convenient source of tap water. The unit may then be placed in the home, car or any point of use, and can be used completely remote from any source of electricity or water supply because of the gravity feed of the water through the beds. The treatment of the water takes place automatically as the water feeds by gravity through the ion exchange resin chambers so as to maintain a constant supply of treated water in the chamber E without pumping water or requiring external equipment.

It should be understood that the foregoing description and drawings of the invention are not intended to be limiting, but are only exemplary of the inventive features which are defined in the claims.

What is claimed is:

1. An apparatus for the purification of water by ion exchange which comprises:
   upper storage means for untreated water;
   a fluid tight intermediate water treatment means having an inlet to receive water from said untreated water storage means;
   lower fluid tight storage means for treated water having an inlet to receive water from said intermediate water treatment means;
   valve means with said lower storage means for selectively withdrawing desired quantities of the treated water therefrom; and
   manometer vent means with said intermediate treatment means and said lower storage means extending above the level of water in said upper storage means to permit equalization of the pressure between said upper storage means, said intermediate water treatment means and said lower storage means at all times, whereby water placed in said upper storage means will flow from the untreated water storage means through said intermediate water treatment means into said lower storage means to equalize pressures in said upper storage means, said intermediate water treatment means and said lower storage means when water is withdrawn from said lower storage means by the opening of said valve means.

2. The water purification apparatus of claim 1, wherein said intermediate water treatment means comprises, in sequence;
- a first water treatment chamber containing an activated carbon water treatment having an inlet connected to said upper storage means and a manometer vent tube extending above the level of water in said upper storage means;
- a second water treatment chamber containing a cation exchange resin water treatment having an inlet connected to said first water treatment chamber and a manometer vent tube extending above the level of water in said upper storage means; and
- a third water treatment chamber containing an anion exchange resin water treatment having an inlet connected to said second water treatment chamber, a manometer vent tube extending above the level of water in said upper storage means, and an outlet connected to said lower storage means.

3. The water treatment means of claim 2, wherein said activated carbon water treatment, said cation exchange resin water treatment and said anion exchange resin water treatment comprise removable cartridges to allow replacement or regeneration of the water treatment elements.

4. The water purification apparatus of claim 3, wherein said upper storage means, and said lower storage means and said water treatment means are enclosed within a single multicompartment apparatus wherein said water treatment cartridges are enclosed in separate chambers within said lower water storage means and below said upper water storage means.

5. The water purification apparatus of claim 3, wherein said first water treatment chamber, said second water treatment chamber and said third water treatment chamber include removable covers to allow access to said removable cartridges.

6. The apparatus for the purification of water of claim 1, wherein said water treatment means comprises:
- a first water treatment chamber containing an activated carbon water treatment means having an inlet connected to said upper storage chamber; and
- a second water treatment chamber containing a combined cation-anion exchange resin water treatment means having an inlet connected to said upper storage chamber and an outlet connected to said lower storage chamber.

7. The water purification apparatus of claim 6, wherein said activated carbon and said cation-anion resin are contained in removable cartridges to allow replacement or regeneration of said water treatment cartridges.

8. The water purification apparatus of claim 7, wherein said first water treatment chamber and said second water treatment chamber include removable covers to allow access to said removable cartridges.

9. An apparatus for the purification of water by ion exchange which comprises:
- a fluid tight container having a removable top divided into an upper chamber for storage of untreated water;
- a series of fluid tight water treatment means having an inlet to receive water from said upper chamber;
- a lower fluid tight chamber for storage of treated water having an inlet to receive water from said series of water treatment means;
- valve means in said lower chamber for removal of treated water therefrom; and
- manometer vent means with said series of water treatment means and said lower storage means, extending from said series of water treatment means in said lower storage means into said upper chamber, above the level of water therein to permit equalization of the pressure between said upper chamber, said series of water treatment means and said lower chamber at all times, whereby water placed in said upper storage means will flow through said series of water treatment means into said lower chamber means to equalize pressures in said upper chamber, said series of water treatment means and said lower chamber when water is withdrawn from said lower chamber by said valve means.

* * * * *